(12) United States Patent
Lee et al.

(10) Patent No.: US 8,244,320 B2
(45) Date of Patent: Aug. 14, 2012

(54) CASE OF A MOBILE TERMINAL COMPRISING A MAIN BODY AND A COVER

(75) Inventors: Dong Ho Lee, Seoul (KR); Won Seok Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 560 days.

(21) Appl. No.: 12/482,936

(22) Filed: Jun. 11, 2009

(65) Prior Publication Data

US 2009/0312066 A1 Dec. 17, 2009

(30) Foreign Application Priority Data

Jun. 12, 2008 (KR) .................. 10-2008-0055344

(51) Int. Cl.
*H04M 1/00* (2006.01)
*B29B 7/00* (2006.01)
*B29C 45/00* (2006.01)
(52) U.S. Cl. ................ 455/575.4; 455/575.8; 264/328.8
(58) Field of Classification Search .............. 455/550.1, 455/575.1, 575.4, 575.8; 379/433.11, 433.12; 264/328.1, 328.8; 361/679.01, 679.56; 150/165
See application file for complete search history.

(56) References Cited

U.S. PATENT DOCUMENTS

| 7,599,709 | B2* | 10/2009 | Kim | 455/550.1 |
|---|---|---|---|---|
| 2003/0223184 | A1* | 12/2003 | Nakamura | 361/679 |
| 2004/0108618 | A1* | 6/2004 | Kwak | 264/132 |
| 2007/0036351 | A1* | 2/2007 | Yang et al. | 379/433.13 |
| 2007/0252305 | A1* | 11/2007 | Kuo et al. | 264/255 |
| 2008/0264535 | A1* | 10/2008 | Yu et al. | 150/165 |
| 2009/0218725 | A1* | 9/2009 | Thelemann et al. | 264/251 |

* cited by examiner

*Primary Examiner* — Nguyen Vo
(74) *Attorney, Agent, or Firm* — Birch, Stewart, Kolasch & Birch, LLP

(57) ABSTRACT

A mobile terminal fabricated through co-injection molding is provided. The mobile terminal includes a first case and a second case coupled to the first case. The first case includes a main body having a keypad and a cover formed on the main body. The cover is co-injection molded with the main body whereby no parting lines are formed between the cover and the main body. A method of forming a case of a mobile terminal is also provided. The method includes injection molding a main body using a first resin material, the main body having a keypad, and injection molding a cover onto the main body using a second resin material different from the first resin material, whereby no parting lines are formed between the cover and the main body.

13 Claims, 7 Drawing Sheets

CASE OF A MOBILE TERMINAL COMPRISING A MAIN BODY AND A COVER

CROSS-REFERENCE TO RELATED APPLICATIONS

This application claims priority from Korean Patent Application No. 10-2008-0055344, filed on Jun. 12, 2008, the disclosure of which is incorporated herein by reference in its entirety.

BACKGROUND OF THE INVENTION

1. Field of the Invention

The present invention relates generally to a mobile terminal, and more particularly to a mobile having a front case and a rear case where the front case includes a main body and cover on the main body, which were formed by co-injection molding.

2. Description of Related Art

Mobile terminals are portable devices that users with various services such as a voice calling service, a video calling service, an information input/output service, and a data storage service. Mobile terminals may have a first body including a display module such as a liquid crystal display (LCD) and a second body having a user input unit such as a keypad. The first body and the second body may be electrically and physically connected by being hinged by a hinge device or may be electrically and physically connected so as to be slidingly movable. Each of the first and second bodies may include a pair of cases: a front case on which a display module such as an LCD or a user input unit such as a keypad is disposed; and a rear case on which the display module or the user input unit is not disposed.

For example, a related art mobile terminal may include a front case on which a keypad for generating key input data for controlling the operation of the typical mobile terminal is disposed, and a cover which is coupled to the exterior of the front case and can thus protect the front case. FIG. 7 illustrates an exploded perspective view of a case of such a related art mobile terminal. Referring to FIG. 7, the case includes a first front case 10A-1 and a cover 10A-3 coupled to the first front case 10A-1 so as to protect the first front case 10A-1. The first front case 10A-1 includes a user input unit 13, including a keypad 13-1 for generating key input data in order to control the operation of a mobile terminal. In general, the first front case 10A-1 and the cover 10A-3 are formed separately through independent injection molding processes and are then assembled by being coupled or bonded to each other.

The user input unit 13 may include a cutout 13-2 for defining the keypad 13-1. A pair of grooves 13-4 for improving the coupling between the first front case 10A-1 and the cover 103A is formed on the outer circumferential surface of the first front case 10A-1. A plurality of exposure holes 13-3 is formed through the cover 10A-3 so that the keypad 13-1 of the user input unit 13 can be exposed through the exposure holes 13-3. A pair of protrusions 13-5 may be formed on the inner circumferential surface of the cover 10A-3. The protrusions 13-5 may be inserted into the grooves 13-4 when the exterior case 10A-3 and the first front case 10A-1 are coupled.

Because the front case and the cover are generally formed through separate injection molding processes, an additional operation for assembling the front case and the cover is required, and thus, the number of parts in the related art mobile terminal and the number of processes for fabricating the related art mobile terminal is increased. In addition, the water resistance of the related art mobile terminal may deteriorate due to a high possibility of a water leak through the parting line between the front case and the exterior case. Moreover, assembly errors are highly likely to occur between the front case and the cover.

BRIEF SUMMARY OF THE INVENTION

The present invention provides a mobile terminal in which a case main body and a cover are formed through co-injection molding so that the cover can be incorporated into one body with a keypad of the case main body. Such a mobile terminal would have improved waterproof properties and would contribute to the reduction of the number of parts in the mobile terminal thereby facilitating the fabrication of the mobile terminal.

According to an aspect of the present invention, there is provided a mobile terminal a first case and a second case coupled to the first case. The first case includes a main body having a keypad and a cover formed on the main body. The cover is co-injection molded with the main body whereby no parting lines are formed between the cover and the main body.

According to another aspect of the present invention, a method of forming a case of a mobile terminal is provided. The method includes injection molding a main body using a first resin material, the main body having a keypad, and injection molding a cover onto the main body using a second resin material different from the first resin material, whereby no parting lines are formed between the cover and the main body.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop book computer, a digital broadcast receiver, a personal digital assistant (PDA), a portable multimedia player (PMP), a navigation device, or the like.

Figure 1:
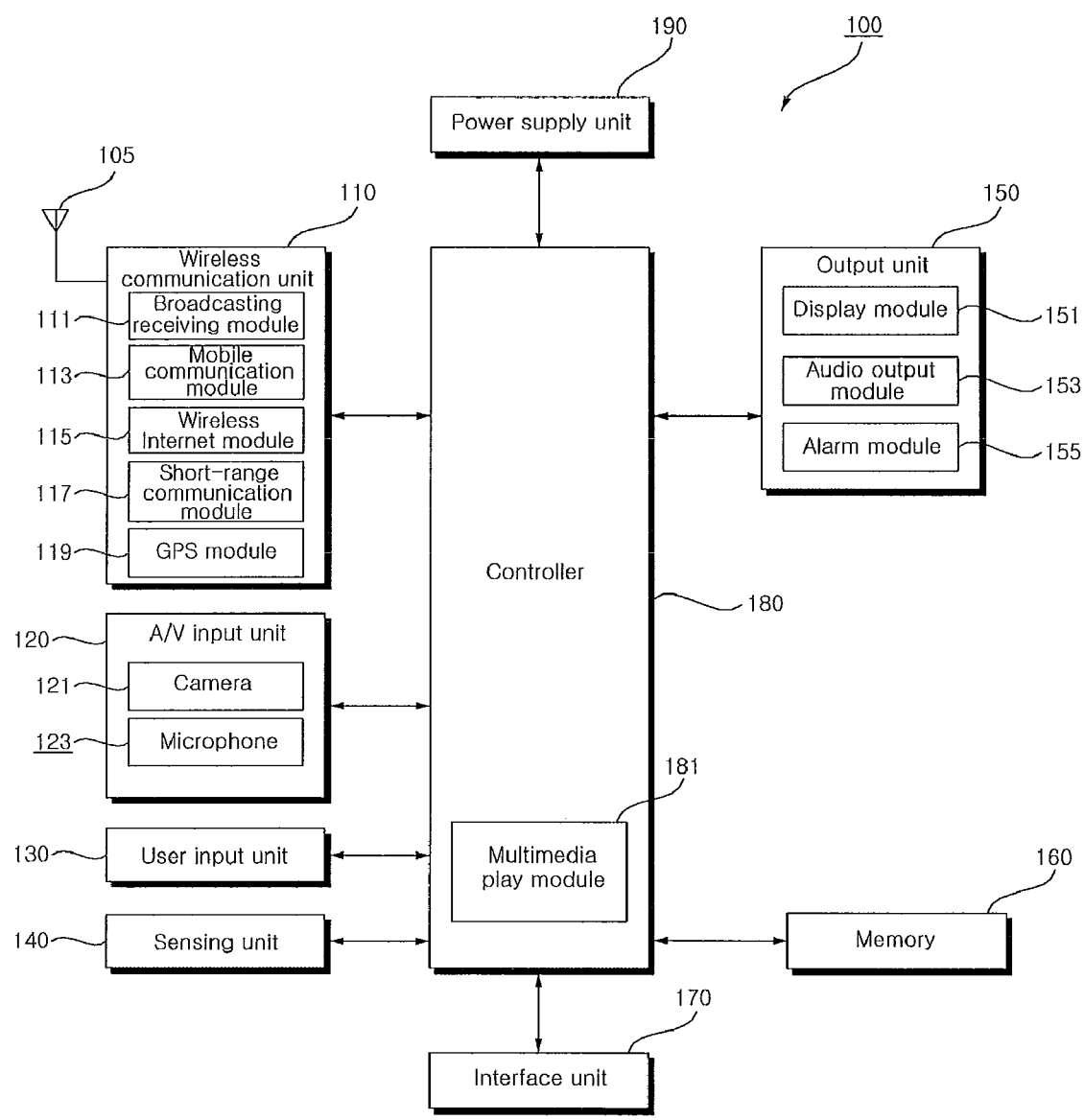
FIG. 1 is a block diagram of a mobile terminal according to an exemplary embodiment of the present invention.

As seen in FIG. 1, a mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast receiving module 111, a mobile communication module 113, a wireless Internet module 115, a short-range communication module 117, and a global positioning system (GPS) module 119. The broadcast receiving module 111 receives a broadcast signal and/or broadcast-related information from an external broadcast management server through a broadcast channel such as a satellite channel and a terrestrial channel. The broadcast management server may be a server which generates broadcast signals and/or broadcast-related information and transmits the generated broadcast signals and/or the generated broadcast-related information or the broadcast management server may be a server which receives and then transmits previously-generated broadcast signals and/or previously-generated broadcast-related information.

Examples of the broadcast-related information include broadcast channel information, broadcast program information and broadcast service provider information. The broadcast-related information may be provided to the mobile terminal 100 through a mobile communication network. In this case, the broadcast-related information may be received by the mobile communication module 113, rather than by the broadcast receiving module 111. The broadcast-related information may come in various forms, for example, electronic program guide (EPG) of digital multimedia broadcasting (DMB) or electronic service guide (ESG) of digital video broadcasting-handheld (DVB-H). Examples of the broadcast signal include a TV broadcast signal, a radio broadcast signal, a data broadcast signal, or the combination of a data broadcast signal and either a TV broadcast signal or a radio broadcast signal.

The broadcast receiving module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcasting-terrestrial (ISDB-T). In addition, the broadcast receiving module 111 may be configured to be suitable for nearly all types of broadcasting systems other than those set forth herein. The broadcast signal and/or the broadcast-related information received by the broadcast receiving module 1110 may be stored in the memory 160.

The mobile communication module 113 transmits wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless Internet module 115 may be a module for wirelessly accessing the Internet. The wireless Internet module 115 may be embedded in the mobile terminal 100 or may be installed in an external device.

The short-range communication module 117 may be a module for short-range communication. The short-range communication module 117 may use various short-range communication techniques such as BLUETOOTH, radio frequency identification (RFID), infrared data association (IrDA), ultra wideband (UWB), and ZigBee.

The GPS module 119 may receive position information from a plurality of GPS satellites.

Figure 2:
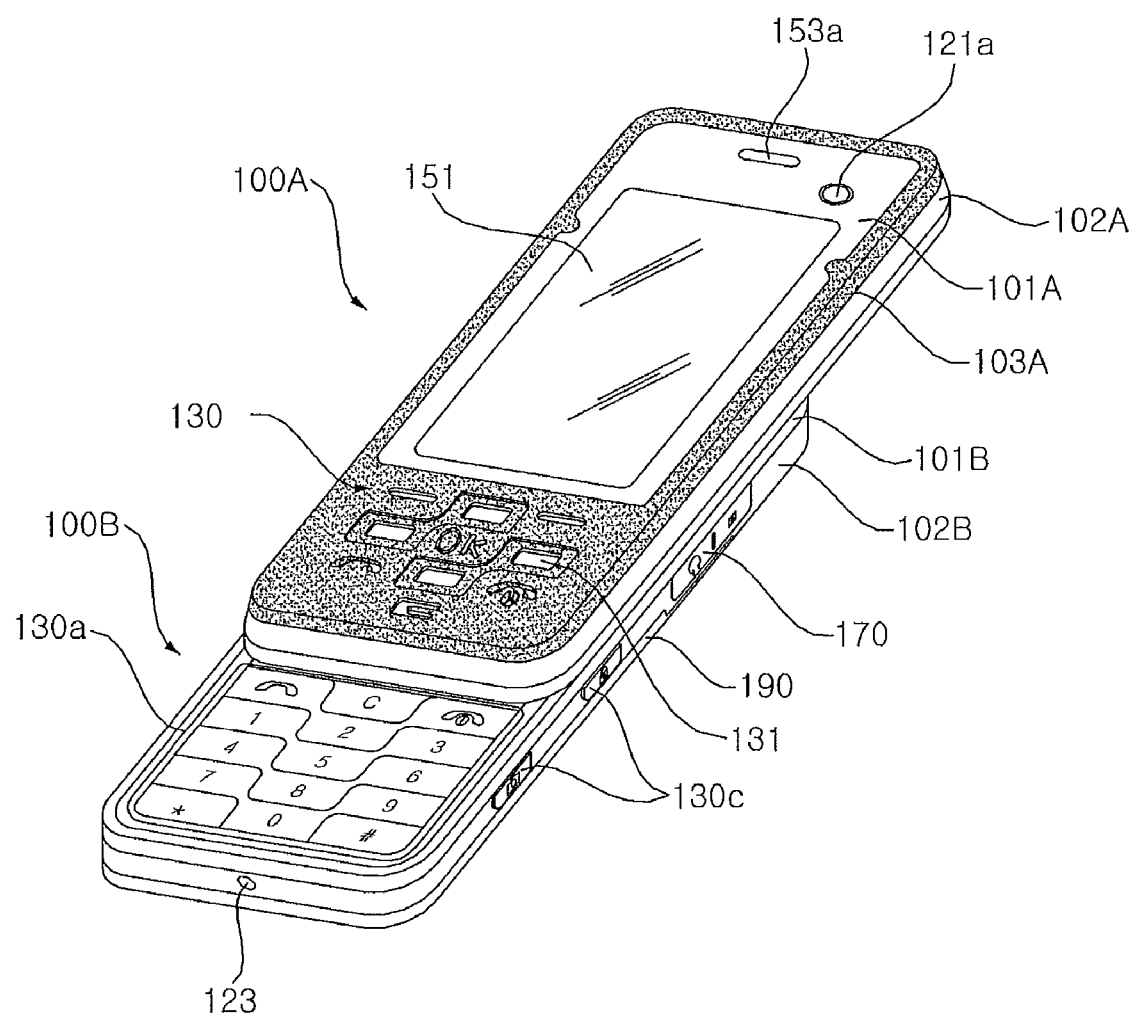
FIG. 2 is a front perspective view of the mobile terminal of FIG. 1.
Figure 3:
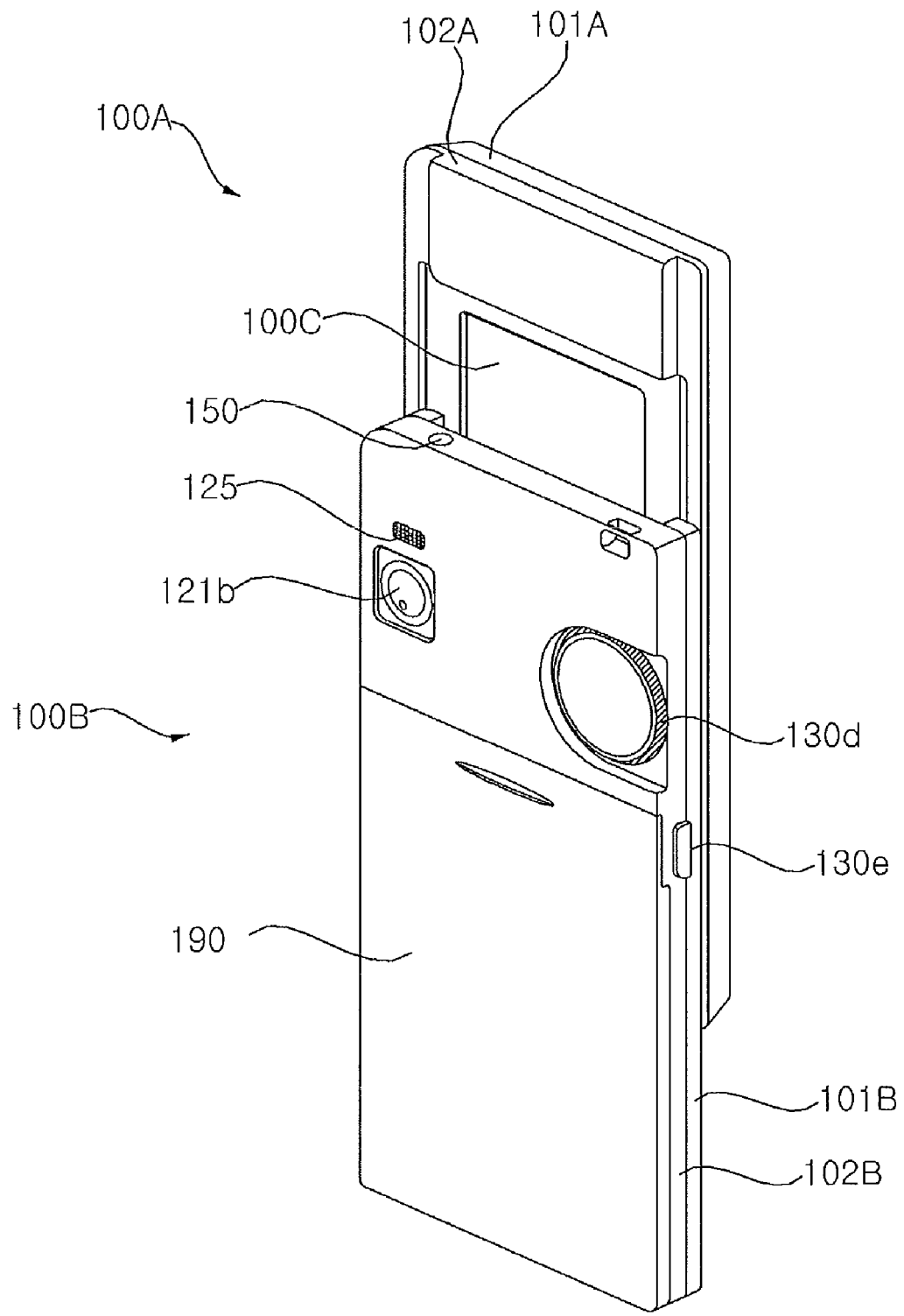
FIG. 3 is a rear perspective view of the mobile terminal of FIG. 2.

The A/V input unit 120 may be used to receive audio signals or video signals. The A/V input unit 120 may include a camera 121 and a microphone 123. The camera 121 processes various image frames such as still images or moving images captured by an image sensor during a video call mode or an image capturing mode. The image frames processed by the camera 121 may be displayed by a display module 151. The image frames processed by the camera 121 may be stored in the memory 160 or may be transmitted outside the mobile terminal 100 through the wireless communication unit 110. The mobile terminal 100 may include two or more cameras 121a, 121b (as shown in FIGS. 2 and 3, respectively).

The microphone 123 receives external sound signals during a call mode, a recording mode, or a voice recognition mode with the use of a microphone and converts the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 generates key input data based on user input for controlling the operation of the mobile terminal 100. The user input unit 130 may be implemented as a keypad, a dome switch, a touch pad (either static pressure or constant electricity), a jog wheel, or a jog switch. In particular, if the user input unit 130 is implemented as a touch pad and forms a mutual layer structure along with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is slid opened or closed. In addition, the sensing unit 140 may determine whether the mobile terminal 100 is powered by the power supply unit 190 and whether the interface unit 170 is connected to an external device.

The output unit 150 may output audio signals, video signals and alarm signals. The output unit 150 may include the display module 151, an audio output module 153, and an alarm module 155. The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a mutual layer structure and are thus implemented as a touch screen, the display module 151 may be used not only as an output device but also as an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by a user. Once a touch input to the touch screen panel is detected, the touch screen panel transmits a number of signals corresponding to the touch input to the touch screen panel controller. The touch screen panel controller processes the signals transmitted by the touch screen panel, and transmits the processed signals to the control unit 180. Then, the control unit 180 determines whether a touch input has been generated and which part of the touch screen panel has been touched based on the processed signals transmitted by the touch screen panel controller.

As described above, if the display module 151 and the user input unit 130 form a mutual layer structure and are thus implemented as a touch screen, the display module 151 may be used not only as an output device but also as an input device. The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown) that is exposed when the mobile terminal is moved from a closed position to an open position.

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal, and a vibration signal. The alarm module 155 may output a vibration signal upon receiving a call signal or a message. In addition, the alarm module 155 may receive a key signal and may output a vibration signal as feedback to the key signal. Once a vibration signal is output by the alarm module 155, the user may recognize that an event has occurred. A signal for notifying the user of the occurrence of an event may be output by the display module 151 or the audio output module 153.

The memory 160 may store various programs necessary for the operation of the controller 180. In addition, the memory 160 may temporarily store various data such as a phonebook, messages, still images, or moving images. The memory 160 may include at least one of a flash memory type storage medium, a hard disk type storage medium, a multimedia card micro type storage medium, a card type memory (such as a secure digital (SD) or extreme digital (XD) memory), a random access memory (RAM), and a read-only memory (ROM). The mobile terminal 100 may operate a web storage, which performs the functions of the memory 160 on the Internet.

The interface unit 170 may interface with an external device that can be connected to the mobile terminal 100. The interface unit 170 may be a wired/wireless headset, an external battery charger, a wired/wireless data port, a card socket for, for example, a memory card or a subscriber identification module (SIM)/user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program.

The power supply unit 190 is supplied with power by an external power source or an internal power source and supplies power to other components in the mobile terminal 100.

The exterior of the mobile terminal 100 will hereinafter be described in detail with reference to FIGS. 2 and 3. The mobile terminal 100 may be a slider-type mobile terminal equipped with the display module 151 and a user input unit 130, but the present invention is not restricted to this. That is, the present invention can be applied to various types of mobile terminals, other than that set forth herein.

Referring to FIG. 2, the mobile terminal 100 may include a first body 100A and a second body 100B which can be slid up or down with respect to the first body 100A. The first body 100A may include a first front case 101A, also referred to as a main body, and a first rear case 102A, and the second body 100B may include a second front case 101B and a second rear case 102B. A cover 103A may be formed in as one body with the front case in which a portion of the user input unit 130 is disposed. Thus, the expression 'front case' may be used as a collective term for both the first or second front case 101A or 101B and the cover 103A.

When the first body 100A completely overlaps the second body 100B, the mobile terminal 100 is determined to be closed. When the first body 100A exposes at least part of the second body 100B, the mobile terminal 100 is determined to be opened up. When the mobile terminal 100 is closed, the mobile terminal 100 generally operates in a standby mode, and may be manually released from the standby mode by a user. When the mobile terminal 100 is opened, the mobile terminal 100 generally operates in a call mode, and may be placed in a standby mode either manually by a user or automatically after the lapse of a predetermined amount of time.

The exterior of the first body 100A may be formed by the first front case 101A, the first rear case 102A, and the cover 103A. Various electronic products may be installed in the empty space between the first front case 101A and the first rear case 102A. At least one intermediate case may be additionally disposed between the first front case 101A and the first rear case 102A. The first front case 101A and the first rear case 102A may be formed of a synthetic resin through injection molding. Alternatively, one of the first front case 101A and the first rear case 102A may be formed of a metal such as stainless steel (STS) or titanium (Ti).

The display module 151, a first audio output module 153a and a first camera 121a may be disposed on the first front case 101A of the first body 100A. The display module 151 may include an LCD or an OLED, which visually represents information. If a touch pad is configured to overlap the display module 151 to provide a layer structure, the display module 151 may serve as a touch screen. Thus, it is possible for a user to input information to the display module 151 simply by touching the display module 151. The first audio output module 153a may be implemented as a receiver or a speaker. The first camera 121a may be configured to capture a still image or a moving image of a user.

The exterior of the second body 100B may be formed by the second front case 101B and the second rear case 102B. A first user input module 130a may be disposed at the front of the second front case 101B of the second body 100B. A second user input module 130c, the microphone 123 and the interface unit 170 may be disposed on the second front case 101B or the second rear case 102B. The microphone 123 may be configured to be able to receive the voice of a user or other sounds.

The first user input module 130a may allow a user to input commands for controlling the operation of the mobile terminal 100. The third user input module 130d may be mounted at the rear of the second rear case 102B of the second body 100B. The third user input module 130d may be implemented as a wheel and may serve as a special function key such as a scroll key. The fourth user input module 130e may be disposed on one side of the second rear case 102B. The fourth user input module 130e may be used to choose certain functions or may serve as an 'enter' key. The fourth user input module 130e may also serve as a hot key for activating certain functions of the mobile terminal 100. In addition, the user input unit 130 may also incorporate the keypad 131.

The user input unit 130 may include the first and second user input modules 130a and 130c and third and fourth user input modules 130d and 130e. The user input unit 130 may adopt various manipulation methods as long as it can offer tactile feedback to a user. For example, the user input unit 130 may be implemented as a dome switch or a touch pad which receives a command or information upon being pushed or touched by a user. Alternatively, the user input unit 130 may be implemented as a wheel, a jog dial, or a joystick. The first user input module 130a may allow a user to input commands such as 'start', 'end', and 'scroll', numbers, characters or symbols. The second user input module 130c may serve as hot keys for activating certain functions of the mobile terminal 100. The mobile terminal 100 may also include various other input keys capable of performing the functions of a mouse such as a joystick key, a touch pad, a trackball, a pointing stick or a finger mouse.

The interface unit 170 may serve as a path for allowing the mobile terminal 100 to exchange data with an external device. For example, the interface unit 170 may be a connection terminal for connecting an earphone to the mobile terminal 100 in a wired or wireless manner, a port for short-range communication or a power supply terminal for supplying power to the mobile terminal 100. The interface unit 170 may be a SIM or a UIM or may be a card socket for an exterior-type card such as a memory card for storing data.

The power supply unit 190 may be disposed on one side of the second rear case 102B. The power supply unit 190 may be a rechargeable battery and may be coupled to the second body 100B so as to be attachable to or detachable from the second body 100B.

FIG. 3 illustrates a rear perspective view of the mobile terminal 100 shown in FIG. 2. Referring to FIG. 3, a second camera 121b may be disposed at the rear of the second rear case 102B of the second body 100B. The second camera 121b may have a different photographing direction from that of the first camera 121a shown in FIG. 2. In addition, the resolution of the second camera 121b may be different from the resolution of the first camera 121a. For example, the first camera 121a may be used to capture an image of the face of a user and then readily transmit the captured image during a video call. Thus, a low-resolution camera may be used as the first camera 121a. The second camera 121b may be used to capture an image of an ordinary subject. Given that images captured by the second camera 121b generally do not need to be transmitted, a high-resolution camera may be used as the second camera 121b. A camera flash 125 and a mirror (not shown) may be disposed near the second camera 121b. The camera flash 125 illuminates a subject when the second camera 121b captures an image of the subject. The user may look in the mirror for taking a self shot.

An antenna (not shown) for receiving a broadcast signal may be disposed on one side of the second rear case 102B. The antenna may be installed so as to be able to be ejected from the second body 102B. A slider module 100C may be coupled to the first rear case 102A of the first body 100A. The slider module 100C may couple the first body 100A and the second body 100B so that the first body 100A can slide up or down with respect to the second body 100B. Part of the slider module 100C may be hidden from view by the second front case 101B of the second body 100B.

While the second camera 121b is illustrated in FIG. 3 as being disposed on the second body 100B, the present invention is not restricted to this. For example, at least one of the antenna, the second camera 121b and the camera flash 125 may be mounted on the first rear case 102A of the first body 100A. In this configuration, whichever of the antenna, the second camera 121b and the camera flash 125 mounted on the first rear case 102A may be protected by the second body 100B when the mobile terminal 100 is closed. In addition, the second camera 121b may be optional if the first camera 121a is rotatable and can thus cover the photographing direction of the second camera 121b.

A case for use in the mobile terminal according to the present invention will hereinafter be described in detail, taking as an example the first front case 101A where the user input unit 130 is disposed. However, the present invention can also be applied to the second front case 101B.

Figure 4:
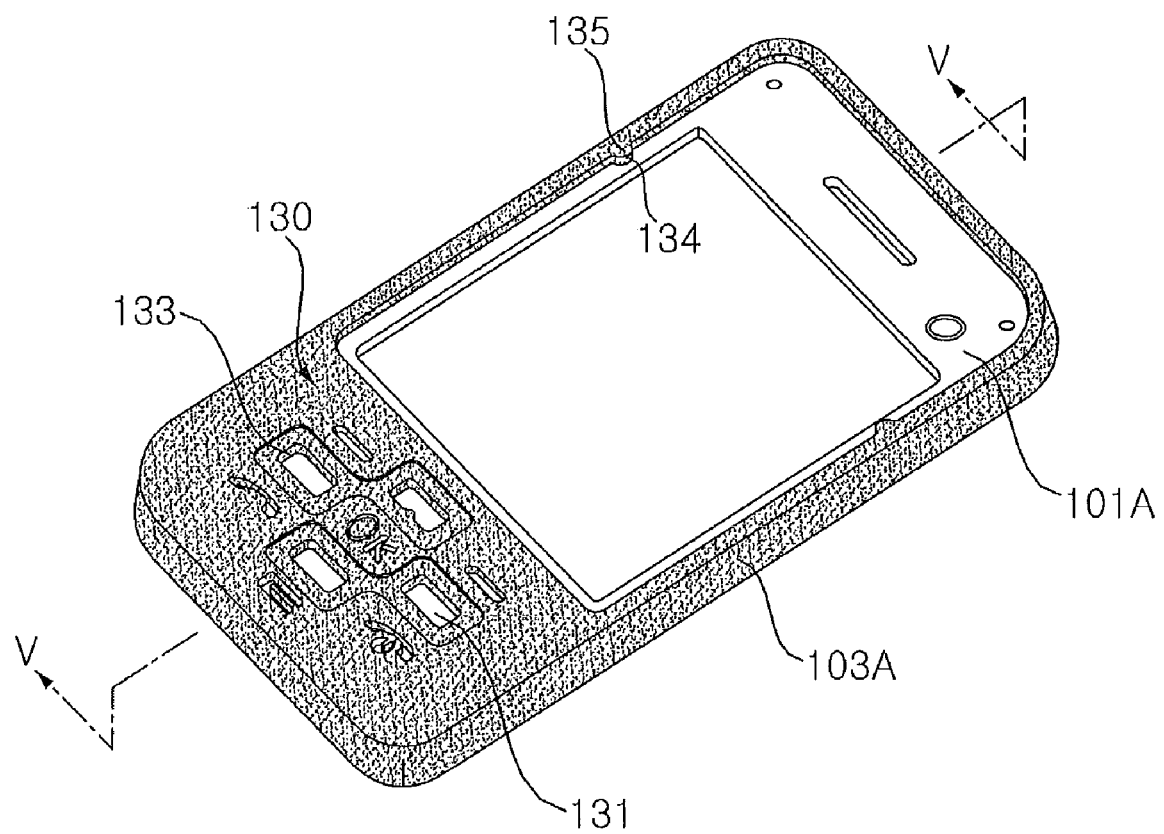
FIG. 4 is a perspective view of a case of the mobile terminal of FIG. 2, according to an exemplary embodiment of the present invention.

Referring to FIG. 4, as noted above, the case of the mobile terminal 100 may include a first front case 101A and a cover 103A. A keypad 131 of the user input unit 130 for allowing a user to input various data and processing data input by the user may be formed on the first front case 101A. The cover 103A may be disposed on the exterior of the first front case 101A and may be formed as one body with the first front case 101A through co-injection molding.

Figure 5:
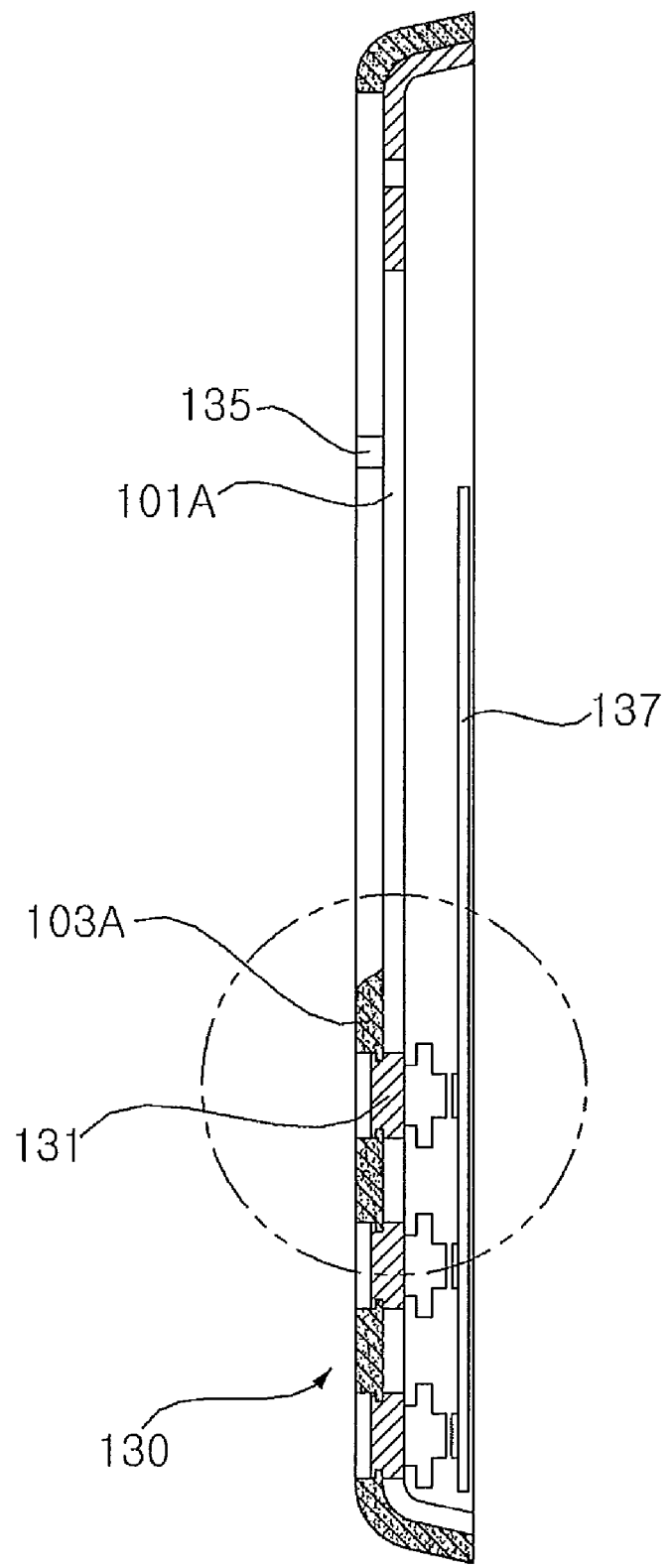
FIG. 5 is a cross-sectional view taken along line of V-V of FIG. 4.
Figure 6:
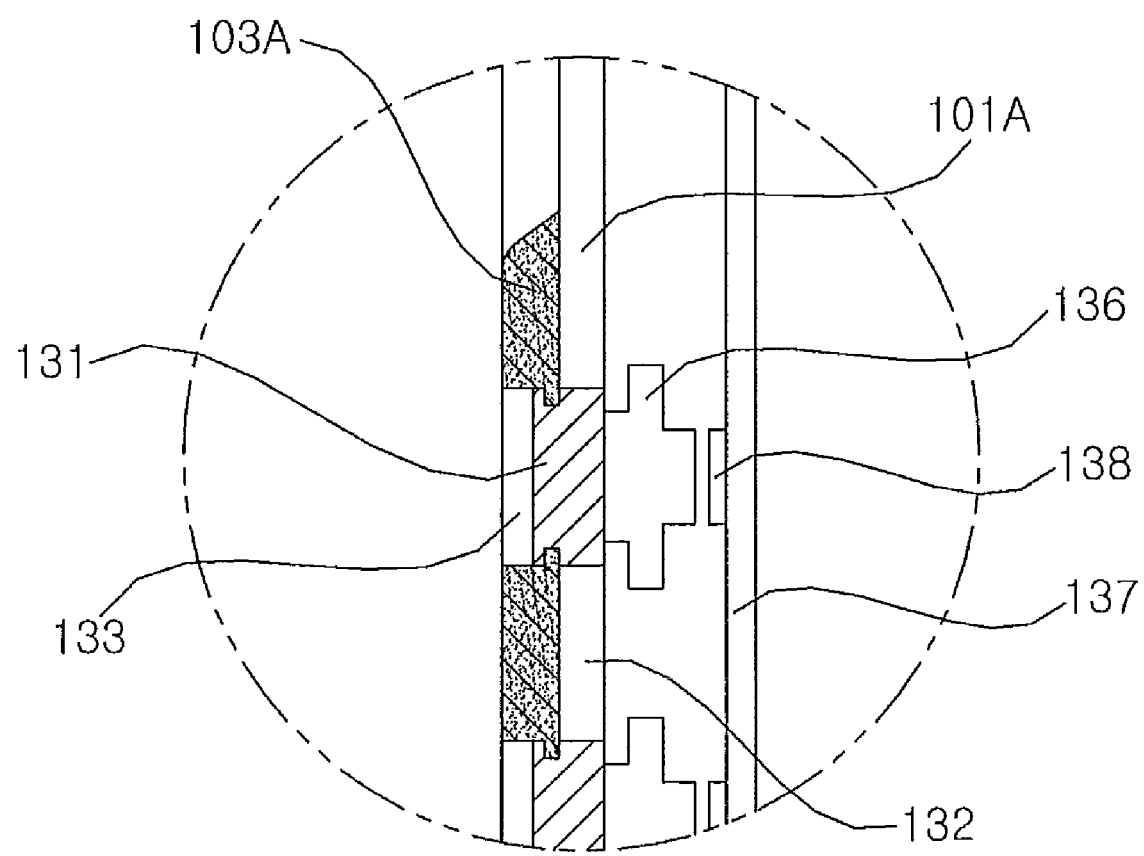
FIG. 6 is a detail view of call-out VI of FIG. 5.
Figure 7:
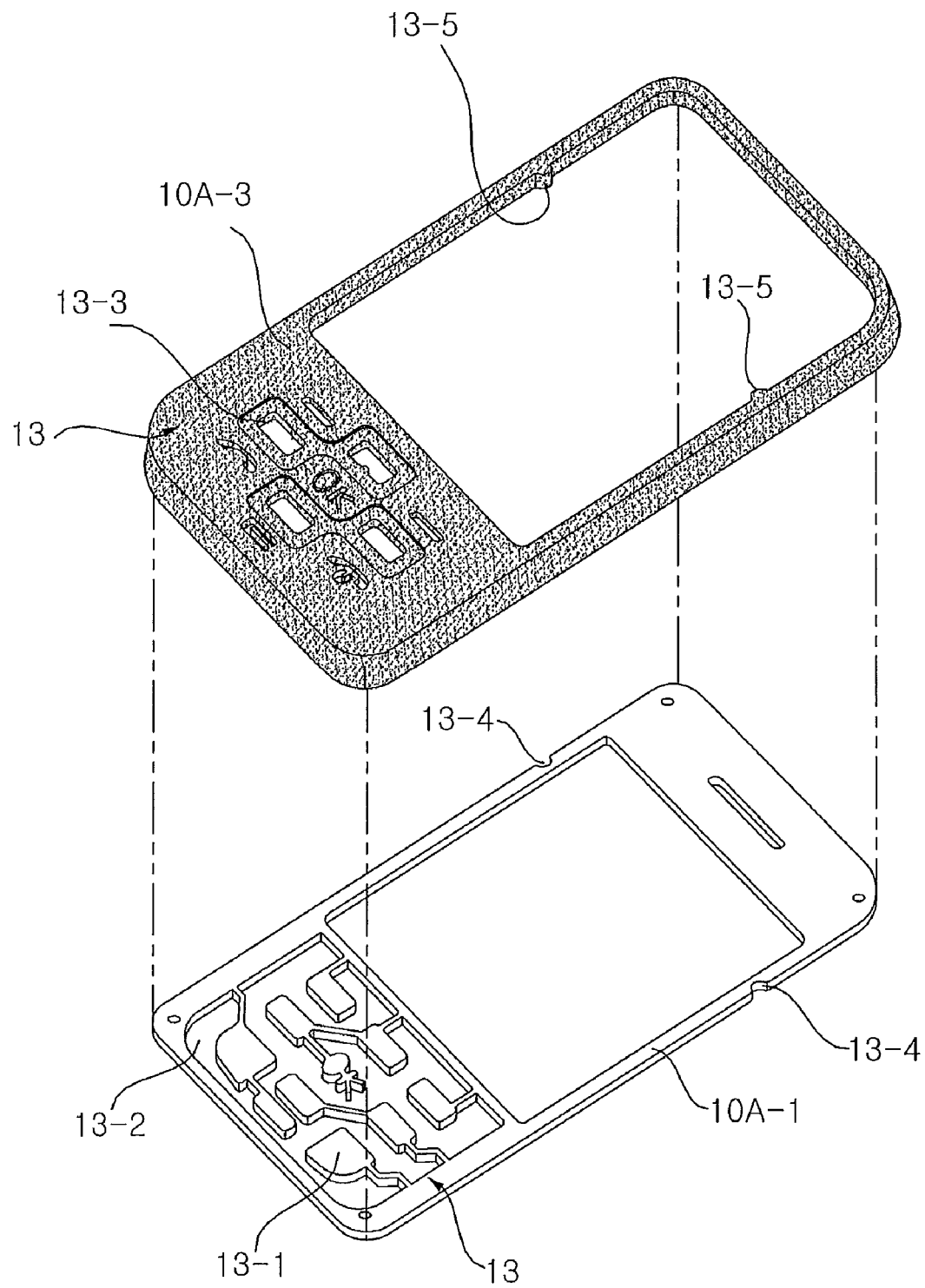
FIG. 7 is an exploded perspective view of a case of a related art mobile terminal.

More specifically, a cutout for defining the keypad 131 may be formed by performing a primary injection molding operation using a first mold. Thereafter, a plurality of exposure holes 133 for exposing the keypad 131 may be formed by performing a secondary injection molding operation using a second mold. The second mold may be designed so as to properly expose the keypad 131 through the exposure holes 133. A pair of grooves 134 may be formed on the outer circumferential surface of the first front case 101A in order to improve the coupling between the first front case 101A and the cover 103A during a co-injection molding operation. The shape of a second mold cavity may be appropriately designed so that the keypad 131 of the first front case 101A can be exposed through the exposure holes 133 of the cover 100-3. A pair of protrusions 135 respectively corresponding to the grooves 134 may be formed on the inner circumferential surface of the cover 103A by filling the grooves 134 of the first front case 101A with second molten resin using the second mold. Portions of the keypad 131 may be inserted into the exposure holes 133 and may thus be firmly attached to the cover 103A, as shown in FIGS. 5 and 6, according to the shape of the second mold cavity. The first front case 101A and the cover 103A may be formed of different types of resins having different colors. More specifically, the cover 103A may be formed of an elastic material such as synthetic rubber.

Alternatively, the protrusions 135 may be formed on the outer circumferential surface of the first front case 101A in order to improve the coupling between the first front case 101A and the cover 103A during a co-injection molding operation. Thereafter, the grooves 134 may be formed on the inner circumferential surface of the cover 103A so as to conform to the shape of the protrusions 135 by filling the second mold cavity with the second molten resin. In this manner, the first front case 101A and the cover 103A may be firmly coupled to each other and may be incorporated into one body.

An actuator 136 may be formed in the first front case 101A and may be incorporated into the one body with the first front case 101A. The actuator may press a switch 138 (e.g., a dome switch) mounted on a printed circuit board (PCB) 137 in the first body 100A and may thus transmit a user input signal generated using the keypad 131 to the controller 180.

It will hereinafter be described how signals are transmitted within the mobile terminal 100 in response to manipulation of the keypad 131. Referring to FIGS. 4-6, if the user presses the keypad 131 through the exposure holes 133 of the cover 103A, the actuator 136, which is formed in the first front case 101A, may press the switch 138 on the PCB 137 in the first body 100A and may thus transmit an input signal to the controller 180.

The manufacture of the mobile terminal 100 may involve performing a primary injection molding operation for forming the first front case 101A and performing a secondary injection molding operation for forming the cover 103A as one body with the first front case 101A. The primary injection molding operation may be performed by inserting first molten resin into a first mold cavity of a co-injection molding machine. The secondary injection molding operation may be performed by placing the first front case 101A, which is obtained by the primary injection molding operation, in a second mold cavity, and filling the second mold cavity with second molten resin.

Co-injection molding is a type of injection molding characterized by using two different materials or colors. Co-injection molding may involve installing two molds (e.g., first and second molds) in an injection molding machine; performing a primary injection molding operation by filling the first mold with first molten resin; and performing a secondary injection molding operation on a preform obtained by the primary injection molding operation by filling the second mold with second molten resin. Thus, co-injection molding may be used to fabricate two parts to be assembled, fabricate two parts having different colors or use different resins for the exterior and the interior of a product for reducing the manufacturing cost of the product.

In general, a co-injection molding machine includes two or more injection units for heating, melting, and injecting various materials. Co-injection molding may be performed by sequentially injecting a plurality of materials into a mold while moving the injection units of the co-injection molding machine back and forth. More specifically, co-injection molding may be performed by injecting a first material into a mold and then injecting a second material into the mold so as to surround a preform formed of the first material before the preform is completely cured. Therefore, it is possible to use an expensive material for forming the exterior of a product and a cheap material for forming the interior of the product and thus to reduce the manufacturing cost of the product. In addition, it is possible to fabricate various thick products. Co-injection molding may be preformed by injecting resin into a mold while moving the mold or a number of injection units of a co-injection molding machine mold or by appropriately opening or blocking the path for injecting resin into a mold.

More specifically, co-injection molding may be performed by rotating a mold in a first direction, performing a primary injection molding operation using a first injection unit of a co-injection molding machine, returning the mold to its initial position and rotating the mold in a second direction, which is opposite to the first direction, and performing a secondary injection molding operation using a second injection unit of the co-injection molding machine. Alternatively, co-injection molding may be performed by performing the primary injection molding operation and then the secondary injection molding operation while rotating the mold in the same direction. However, the present invention is not restricted to this. That is, co-injection molding may be preformed in various manners, other than those set forth herein.

As described above, according to the present invention, the first front case 101A and the cover 103A may be formed through co-injection molding, instead of forming the first front case 101A and the cover 103A separately and assembling the first front case 101A and the cover 103A, so that the keypad 131 of the first front case 101A can be incorporated into one body with the cover 103A. Therefore, it is possible to remove parting lines between the first front case 101A and the cover 103A to provide improved waterproof properties. In addition, it is possible to reduce the number of parts in the mobile terminal to facilitate the fabrication of a mobile terminal.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile terminal comprising:
   a first case; and
   a second case coupled to the first case,
   wherein the first case includes:
     a main body having a keypad; and
     a cover formed on the main body, the cover being co-injection molded onto an outer surface of the main body whereby no parting lines are formed between the cover and the main body,
   wherein the main body includes at least one hole formed at an edge of the main body and the cover includes at least one protrusion received by the at least one hole of the main body, thereby coupling firmly the main body and the cover due to combination of the hole and the protrusion.

2. The mobile terminal of claim 1, wherein the cover includes a plurality of through holes, and the keypad includes a plurality of key button, each key button being exposed through a correspond through hole of the cover.

3. The mobile terminal of claim 2, wherein each key button is attached to the cover at the corresponding through hole.

4. The mobile terminal of claim 1, further comprising a slide module slidably connecting a rear surface of the first case to a front surface of the second case.

5. The mobile terminal of claim 1, wherein the main body is formed of a first resin material and the cover is formed of a second resin material different than the first resin material.

6. The mobile terminal of claim 5, wherein the first resin material and the second resin material have different colors.

7. The mobile terminal of claim 1, further comprising a display located in the first case, the main body including an opening to receive the display therein.

8. The mobile terminal of claim 7, wherein the display is a touch screen.

9. The mobile terminal of claim 1, wherein the first case is one of a front case and a rear case of mobile terminal, the first case being slidably coupled to the second case.

10. The mobile terminal of claim 1, further comprising:
a controller located in one of the first and second cases;
a printed circuit board (PCB) located in the first case, the printed circuit board including a switch; and
an actuator located at the keypad on the main body, the actuator being configured to transmit a user input signal generated through the keypad to the controller by pressing the switch of the PCB.

11. A method of forming a case of a mobile terminal, the method comprising:
injection molding a main body using a first resin material, the main body having a keypad; and
sequentially injection molding a cover onto the main body using a second resin material different from the first resin material before solidifying of the main body, whereby no parting lines are formed between the cover and the main body,
wherein the main body includes at least one hole formed at an edge of the main body and the cover includes at least one protrusion received by the at least one hole of the main body, thereby coupling firmly the main body and the cover due to combination of the hole and the protrusion, and
wherein injection molding the cover comprises filling the second resin material in the at least one hole to form at least one protrusion on the cover.

12. A mobile terminal comprising:
a first case; and
a second case coupled to the first case,
wherein the first case includes:
a main body having a keypad; and
a cover formed on the main body, the cover being co-injection molded onto an outer surface of the main body whereby no parting lines are formed between the cover and the main body,
wherein the cover includes at least one hole formed at an edge of the cover and the main body includes at least one protrusion received by the at least one hole of the cover, thereby coupling firmly the main body and the cover due to combination of the hole and the protrusion.

13. A method of forming a case of a mobile terminal, the method comprising:
injection molding a main body using a first resin material, the main body having a keypad; and
sequentially injection molding a cover onto the main body using a second resin material different from the first resin material before solidifying of the main body, whereby no parting lines are formed between the cover and the main body,
wherein the cover includes at least one hole formed at an edge of the cover and the main body includes at least one protrusion received by the at least one hole of the cover, thereby coupling firmly the main body and the cover due to combination of the hole and the protrusion, and
wherein injection molding the cover comprises filling the second resin material on the at least one protrusion to form the at least one hole of the cover.

* * * * *